United States Patent
Phaff et al.

(10) Patent No.: US 9,645,385 B2
(45) Date of Patent: May 9, 2017

(54) METHODS AND APPARATUSES FOR FABRICATING ELECTROWETTING DISPLAYS

(71) Applicant: Amazon Technologies, Inc., Reno, NV (US)

(72) Inventors: Ernest Jannis Phaff, Nuenen (NL); Hermanus Johannes Jansen, Veldhoven (NL); Henricus Matheus Josephus Leenen, Limburg (NL)

(73) Assignee: Amazon Technologies, Inc., Seattle, WA (US)

( * ) Notice: Subject to any disclaimer, the term of this patent is extended or adjusted under 35 U.S.C. 154(b) by 321 days.

(21) Appl. No.: 14/316,349

(22) Filed: Jun. 26, 2014

(65) Prior Publication Data

US 2015/0378145 A1    Dec. 31, 2015

(51) Int. Cl.
*B05C 9/06* (2006.01)
*G02B 26/00* (2006.01)
*B05C 5/00* (2006.01)

(52) U.S. Cl.
CPC .............. *G02B 26/005* (2013.01); *B05C 9/06* (2013.01); *B05C 5/004* (2013.01); *B05C 5/005* (2013.01)

(58) Field of Classification Search
CPC ................................ B05C 9/06; G02B 26/005
See application file for complete search history.

(56) References Cited

U.S. PATENT DOCUMENTS

| | | | |
|---|---|---|---|
| 9,182,589 B2 | 11/2015 | Sakai et al. | |
| 2004/0180130 A1* | 9/2004 | Wixforth | B01L 3/502792 427/2.1 |
| 2011/0157677 A1 | 6/2011 | Chen et al. | |
| 2015/0378146 A1 | 12/2015 | Phaff et al. | |

FOREIGN PATENT DOCUMENTS

| | | |
|---|---|---|
| EP | 1076257 | 2/2001 |
| WO | WO2009106546 | 9/2009 |
| WO | WO2010133690 | 11/2010 |
| WO | WO2013087858 | 6/2013 |
| WO | WO2013087859 | 6/2013 |
| WO | WO2014072425 | 5/2014 |

OTHER PUBLICATIONS

PCT Search Report and Written Opinion mailed Sep. 16, 2015 for PCT/US15/35416, 11 pages.

(Continued)

*Primary Examiner* — Mark A Osele
*Assistant Examiner* — Christopher C Caillouet
(74) *Attorney, Agent, or Firm* — Lee & Hayes, PLLC

(57) ABSTRACT

An apparatus for fabricating electronic displays comprises a glass substrate that includes pixel arrays formed on the glass substrate. Individual pixels of the pixel arrays include pixel walls to retain a first fluid, such as oil. The pixel arrays may include an edge seal to retain a second fluid, such as an electrolyte solution, that overlays the pixel walls and the first fluid. The glass substrate also includes a hydrophobic strip formed on the glass substrate. A wettability between the first fluid and the hydrophobic strip is different from a wettability between the second fluid and the hydrophobic strip.

19 Claims, 7 Drawing Sheets

(56) References Cited

OTHER PUBLICATIONS

PCT Search Report and Written Opinion mailed Dec. 17, 2015 for PCT application No. PCT/US2015/035395, 14 page.
Sun, et al., "Scalable Fabrication of Electrowetting Displays with Self-Assembled Oil Dosing", Applied Physics Letters, American Institute of Physics, vol. 91, No. 1, Jul. 2, 2007.
Office action for U.S. Appl. No. 14/316,475, mailed on Mar. 3, 2016, Phaff et al., "Pixel Wall Configuration for Directing Fluid Flow for Fabricating Electrowetting Displays", 8 pages.

* cited by examiner

METHODS AND APPARATUSES FOR FABRICATING ELECTROWETTING DISPLAYS

BACKGROUND

Electronic displays are found in numerous types of electronic devices such as electronic book ("eBook") readers, cellular telephones, smart phones, portable media players, tablet computers, wearable computers, laptop computers, netbooks, desktop computers, televisions, appliances, home electronics, automotive electronics, augmented reality devices, and so forth. Electronic displays may present various types of information, such as user interfaces, device operational status, digital content items, and the like, depending on the kind and purpose of the associated device. The appearance and quality of a display can affect a user's experience with the electronic device and the content presented thereon. Accordingly, finding ways to enhance user experience and satisfaction continues to be a priority. Moreover, increased multimedia use imposes high demands on designs, packaging, and fabricating display devices, as content available for mobile use becomes more extensive and device portability continues to be a high priority.

Electronic displays, such as electrowetting displays, include an array of pixels individually bordered by pixel walls that retain a fluid such as opaque oil, for example. Light transmission through each pixel is adjustable by electronically controlling a position of the fluid in the pixel. A process of fabricating an electrowetting display includes a number of steps, a number of which can involve improvements that lead to lower fabricating costs and higher yields.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Overview

Figure 1:
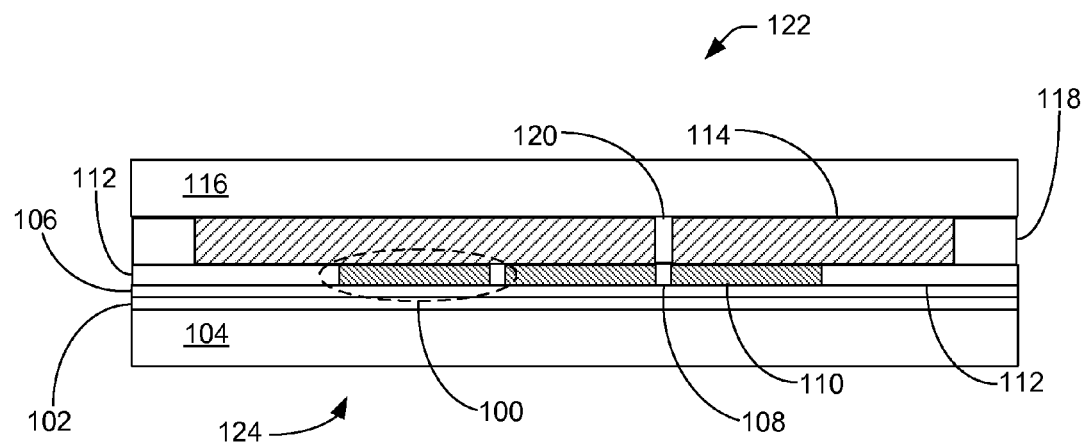
FIG. 1 illustrates a cross-section of a portion of an electrowetting display device, according to some embodiments.

In various embodiments described herein, electronic devices include displays for presenting content and other information. In some examples, the electronic devices may include one or more components associated with the display, such as a touch sensor component layered atop the display for detecting touch inputs, a front light or back light component for lighting the display, and/or a cover layer component, which may include antiglare properties, antireflective properties, anti-fingerprint properties, anti-cracking properties, and the like. Various embodiments described herein also include techniques for assembling electronic devices including these components for the displays and other features described herein.

Embodiments describe apparatuses and techniques for fabricating electrowetting displays. For example, in a batch fabrication environment, a number of display devices comprising arrays of display elements (e.g., pixels or subpixels) may be formed on a single substrate, which may be transparent. A fluid dispenser dispenses a first fluid (e.g., an opaque oil) and a second fluid (e.g., what may be considered to be an electrolyte solution) onto the substrate that includes the display devices. The fluid dispenser dispenses the second fluid so as to cover the dispensed first fluid and the individual display elements. Uniformity of thickness and volume of dispensed first and second fluids across the substrate is desired. Accordingly, in some embodiments, a portion of the substrate may include a wetting strip that affects dispensing of the first and second fluids, as described in detail below. In other embodiments, such a wetting strip may be disposed in the fluid dispenser in addition to, or instead of, the wetting strip formed on the substrate.

Such a fluid dispenser may include a first slit to dispense the first fluid and a second slit to dispense the second fluid. Herein, such a fluid dispenser is called a "double-slit" fluid dispenser, though the fluid dispenser may be a "multi-slit" fluid dispenser and include more than two slits (e.g. one or more slits may be used for each fluid).

In still other embodiments, a top plate, which may be transparent, is moved onto the substrate that includes the display devices and the dispensed first and second fluids. In particular, the fluid dispenser may include a connection portion to which the top plate is attached. Accordingly, as the fluid dispenser is moved across and over the substrate that includes the display devices, the top plate is concomitantly moved or dragged across and over the substrate and the display devices, being substantially supported by the second fluid. Herein, though motions of a fluid dispenser, a top plate and substrate are described as the substrate being stationary while the fluid dispenser and the top plate are moving, the opposite may be the case. In other words, motions among the fluid dispenser, the top plate and the substrate are relative, and claimed subject matter is not limited in this respect.

A display device, such as an electrowetting display device, can be a transmissive, reflective, or transflective display that generally includes an array of display elements (e.g., pixels or subpixels) configured to be operated by an active matrix addressing scheme. For example, rows and columns of electrowetting elements are operated by controlling voltage levels on a plurality of source lines and gate lines. In this fashion, the display device can produce an image by selecting particular display elements to transmit, reflect or block light. Display elements are addressed (e.g., selected) via rows and columns of the source lines and gate lines that are electrically connected to transistors (e.g., used as switches) included in each display element. Transistors take up a relatively small fraction of the area of each display element to allow light to efficiently pass through (or reflect from) the display element. Herein, a display element may, unless otherwise specified, comprise a pixel or subpixel of an electrowetting display device. Such a pixel or subpixel may be the smallest light transmissive element of a display that is individually operable to directly control an amount of light transmission or reflection through the element. For example, in some implementations, a display element may be a pixel that includes a red subpixel, a green subpixel, and a blue subpixel. In other implementations, a display element may be a pixel that is a smallest component, e.g., the pixel does not include any subpixels.

Electrowetting displays include an array of display elements comprising pixels and/or subpixels located between two support plates, such as a substrate and a top plate. For example, the substrate may be a support plate that, in cooperation with the top plate, contains display elements that include at least one electrode, electrowetting oil, electrolyte solution and pixel walls between the support plates. Support plates may include glass, plastic (e.g., a transparent thermoplastic such as PMMA or other acrylic), or other transparent material and may be made of a rigid or flexible material, for example.

Individual pixels are surrounded by pixel walls made, for instance, from photoresist material. Pixel walls retain at least a first fluid which is electrically non-conductive, such as opaque or colored oil, in the individual pixels. A cavity formed between the support plates is filled with the first fluid (e.g., retained by pixel walls) and a second fluid (e.g., an electrolyte solution) which is electrically conductive or polar and may be water or a salt solution such as a solution of potassium chloride water. The second fluid may be transparent, but may be colored or light absorbing. The second fluid is immiscible with the first fluid.

In addition to display elements, spacers and edge seals can also be located between two clear support plates. Hereinafter, example embodiments are described as including clear substrates or support plates that comprise glass support plates. However, support plates can comprise any of a number of transparent amorphous materials, such as plastic, glass, quartz, semiconductors, and so on, and claimed subject matter is not limited in this respect. Herein, describing an element or material as being "transparent" means that the element or material can transmit a relatively large fraction of the light incident upon it. For example, a transparent substrate or layer may transmit more than 70% or 80% of the light impinging on its surface, though claimed subject matter is not limited in this respect.

Spacers and edge seals which mechanically connect a first support plate with a second overlying support plate, or which form a separation between the first support plate and the second support plate, contribute to mechanical integrity of the electrowetting display. Edge seals, for example, being disposed along a periphery of an array of electrowetting display device elements, may contribute to retaining (e.g., first and second) fluids between the first support plate and the second overlying support plate. Spacers are desirably transparent so as to not hinder throughput of light in the electrowetting display. Transparency of spacers can at least partially depend on the refractive index of the spacer material, which should be similar to or the same as the refractive indices of surrounding media. Spacers are also desirably chemically inert to surrounding media.

In various embodiments, a display element of a display device includes, among other things, an electrode layer and a thin film transistor (TFT) that is switched to either select or deselect the electrowetting element using active matrix addressing. A TFT is a particular type of field-effect transistor that includes thin films of an active semiconductor layer as well as a dielectric layer and metallic contacts over a supporting (but non-conducting) substrate, which may be glass or any of a number of other transparent materials, for example.

In some embodiments, TFTs are fabricated onto a glass (or other transparent) substrate or top plate of an electrowetting display device. For example, TFTs may be disposed on a top surface of the glass substrate opposite the side of the substrate adjacent to the display elements, for example.

In some embodiments, a display device as described herein can comprise a portion of a system that includes one or more processors and one or more computer memories, which may reside on a control board, for example. Display software can be stored on the one or more memories and can be operable with the one or more processors to modulate light that is received from an outside source (e.g., ambient room light) or out-coupled from a light guide of the display device. For example, display software can include code executable by a processor to modulate optical properties of individual pixels of the electrowetting display based, at least in part, on electronic signals representative of image or video data. The code can cause the processor to modulate the optical properties of pixels by controlling electrical signals (e.g., voltages, currents, fields, and so on) on, over, or in layers of the electrowetting display.

FIG. 1 is a cross-section of a portion of an electrowetting display device illustrating several electrowetting elements 100, according to some embodiments. An electrode layer 102 is formed on a substrate 104 (e.g., a glass substrate). In some implementations, a dielectric barrier layer (not illustrated) may at least partially separate electrode layer 102 from a hydrophobic layer 106 also formed on substrate 104. In some implementations, hydrophobic layer 106 can comprise a fluoropolymer, such as AF1600, produced by DuPont, based in Wilmington, Del. Hydrophobic layer 106 can also be any of a number of water-repelling materials that affect wettability of an adjacent material, for example. Pixel walls 108 form a patterned electrowetting element grid on hydrophobic layer 106. Pixel walls 108 may comprise a photoresist material, such as epoxy-based negative photoresist SU-8, for example. The patterned electrowetting element grid comprises rows and columns that form an array of electrowetting elements. For example, an electrowetting element can have a width and length in a range of about 50 to 500 microns. A first fluid 110, which can have a thickness (e.g., depth) in a range of about 1 to 10 microns, for example, overlies hydrophobic layer 106. First fluid 110 is partitioned by pixel walls 108 of the patterned electrowetting element grid. An outer rim 112 can comprise the same material as pixel walls 108. A second fluid 114, such as an electrolyte solution, overlies first fluid 110 and pixel walls 108 of the patterned electrowetting element grid. An electrolyte solution can be electrically conductive or polar. For example, an electrolyte solution may be, among other things, water or a salt solution such as potassium chloride water.

A top plate 116 covers second fluid 114 and edge seals 118 retain second fluid 114 over the electrowetting element array. Top plate 116 may be supported by edge seals 118 and spacers 120 that are interspersed throughout the array of display elements 100. For example, some or all spacers 120 may be located over at least a portion of the regions where pixel walls 108 intersect, though claimed subject matter is not limited in this respect. The substrate and the top plate may be made of glass or polymer and may be rigid or flexible, for example.

A voltage V applied across, among other things, second fluid 114 and electrode 102 of individual electrowetting elements can control transmittance or reflectance of the individual electrowetting elements.

The display device has a viewing side 122 on which an image formed by the electrowetting display device can be viewed, and a rear side 124. Top plate 116 faces viewing side 122 and substrate 104 faces rear side 124. In an alternative embodiment, the electrowetting display device may be viewed from rear side 124. The electrowetting display device may be a reflective, transmissive or transflective type. The electrowetting display device may be a segmented display type in which the image is built up of segments. The segments can be switched simultaneously or separately. Each segment includes one electrowetting element 100 or a number of electrowetting elements 100 that may be neighboring or distant from one another. Electrowetting elements 100 included in one segment are switched simultaneously, for example. The electrowetting display device may also be an active matrix driven display type or a passive matrix driven display, just to name a few examples.

Second fluid 114 is immiscible with first fluid 110. Herein, substances are immiscible with one another if the substances do not substantially form a solution. Second fluid 114 is electrically conductive or polar, and may be water or a salt solution such as a solution of potassium chloride in a mixture of water and ethyl alcohol, for example. Second fluid 114 is preferably transparent, but may be colored or light absorbing. First fluid 110 is electrically non-conductive and may for instance be an alkane like hexadecane or (silicone) oil. Hydrophobic layer 106 is arranged on substrate 104 to create an electrowetting surface area. The hydrophobic character causes first fluid 110 to adhere preferentially to substrate 104 since first fluid 110 has a higher wettability with respect to the surface of hydrophobic layer 106 than second fluid 114. Wettability relates to the relative affinity of a fluid for the surface of a solid. Wettability increases with increasing affinity, and it can be measured by the contact angle formed between the fluid and the solid and measured internal to the fluid of interest. For example, such a contact angle can increase from relative non-wettability of more than 90° to complete wettability at 0°, in which case the fluid tends to form a film on the surface of the solid.

First fluid 110 absorbs at least a part of the optical spectrum. First fluid 110 may be transmissive for a part of the optical spectrum, forming a color filter. For this purpose, the fluid may be colored by addition of pigment particles or dye, for example. Alternatively, first fluid 110 may be black (e.g., absorbing substantially all parts of the optical spectrum) or reflecting. Hydrophobic layer 106 may be transparent or made to be reflective. A reflective layer may reflect the entire visible spectrum, making the layer appear white, or part of it, making it have a color.

When a voltage is applied across electrowetting element 100, electrowetting element 100 will enter into an active state. Electrostatic forces will impart motion to the second fluid 114 toward electrode layer 102, thereby repelling first fluid 110 from the area of hydrophobic layer 106 to pixel walls 108 surrounding the area of hydrophobic layer 106, to a droplet-like form. This action uncovers first fluid 110 from the surface of hydrophobic layer 106 of electrowetting element 100. When the voltage across electrowetting element 100 is returned to an in-active signal level of zero or a value near to zero, electrowetting element 100 will return to an inactive state, where first fluid 110 flows back to cover hydrophobic layer 106. In this way, first fluid 110 forms an electrically controllable optical switch in each electrowetting element 100. Of course, such details of an electrowetting display device are merely examples, and claimed subject matter is not limited in this respect.

Figure 2:
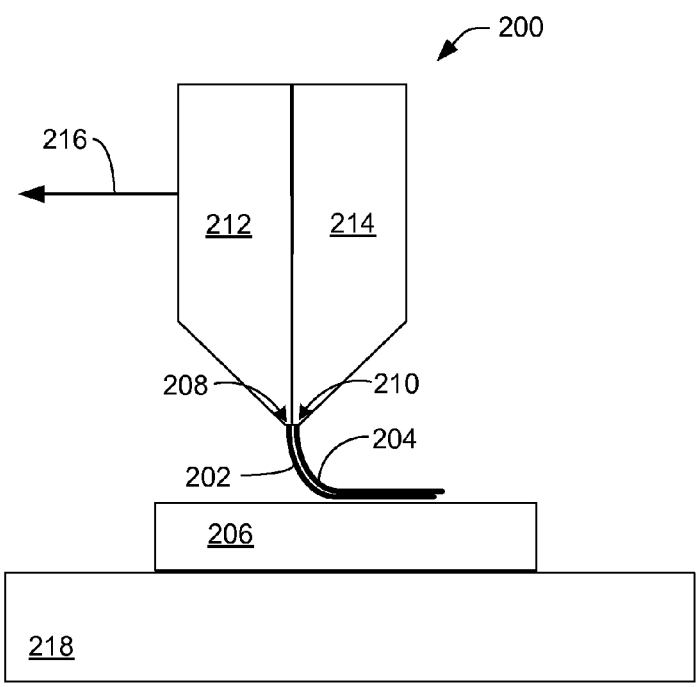
FIG. 2 illustrates a side view of a double-slit fluid dispenser, according to some embodiments.

FIG. 2 illustrates a side view of a double-slit fluid dispenser 200, according to some embodiments. Fluid dispenser 200 is configured to dispense a first fluid 202 (e.g., an opaque oil) and a second fluid 204 (e.g., an electrolyte solution) onto a substrate 206 that includes one or more display element arrays (not illustrated in FIG. 2). For example, a portion of such a substrate may be the same or similar to substrate 104 illustrated in FIG. 1. In some implementations, first fluid 202 and second fluid 204 may be the same as or similar to first fluid 110 and second fluid 114, respectively, shown in FIG. 1. Fluid dispenser 200 may include a first slit 208 for dispensing first fluid 202 and a second slit 210 for dispensing second fluid 204. In some implementations, the first fluid may be transiently contained in first reservoir 212 and the second fluid may be transiently contained in second reservoir 214. A distance between first slit 208 and second slit 210 may be on the order of several millimeters, for example, though claimed subject matter is not limited in this respect. Lengths (e.g., as measured into and out of the page of FIG. 2) of first slit 208 and second slit 210 may range from several centimeters to about 40 centimeters, just to give some examples. In particular, the lengths of the slits are sufficient to at least approximately span the width of the substrate onto which fluid dispenser 200 dispenses the first and second fluids.

During a fabrication process for placing the first and second fluids in display element arrays formed on a substrate, fluid dispenser 200 moves in a direction 216 relative to the underlying substrate 206, which may be supported by a platform 218. Motion of fluid dispenser 200 is relative to platform 218. In other words, during fabrication fluid dispenser 200 moves in direction 216 relative to platform 218 or platform 218 moves opposite direction 216 relative to fluid dispenser 200. Fluid dispenser 200 dispenses first fluid 202 into the display element arrays' individual display elements, which retain the first fluid by their respective pixel walls. Fluid dispenser 200 dispenses second fluid 204 so as to cover the first fluid and the individual display elements.

Figure 3:
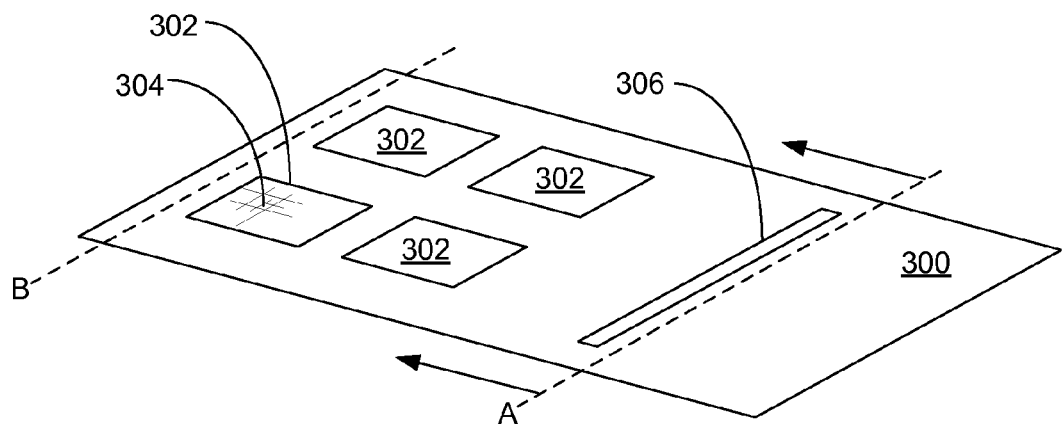
FIGS. 3 and 4 illustrate perspective views of a substrate with display element arrays formed thereon, according to some embodiments.

FIG. 3 illustrates a perspective view of a substrate 300 with display element arrays 302 formed thereon, according to some embodiments. Display element arrays 302 may be configured to be in rows and columns. Although four display element arrays 302 are illustrated in the figures (e.g., four being batch-processed together), any number is possible. For example, the four display element arrays 302 will later be cut into individual portions so as to become four display devices. These four individual portions will include portions of substrate 300, first and second fluids, and portions of a top plate overlying each of the four display element arrays 302. Accordingly, portions of substrate 300 underlying individual display element arrays 302 will later become a permanent part of the display devices (e.g., as a substrate such as 104 illustrated in FIG. 1). Display element arrays 302 include a relatively large number (e.g., thousands or millions) of individual display elements 304 (e.g., pixels or subpixels), which may be the same as or similar to electrowetting elements 100. For example, individual display elements 304 may be the same as or similar to electrowetting elements 100 shown in FIG. 1.

A double-slit fluid dispenser, such as 200 illustrated in FIG. 2, for example, may be placed over substrate 300 anywhere between positions "A" and "B", indicated in FIG. 3. Such a double-slit fluid dispenser is configured to dispense a first fluid and a second fluid onto substrate 300 and display element arrays 302. In particular, the double-slit fluid dispenser dispenses the first and second fluids as the double-slit fluid dispenser moves over substrate 300 (and display element arrays 302). In detail, the double-slit fluid dispenser dispenses the first fluid followed relatively quickly (e.g., within about one second) by dispensing the second fluid. Thus, the first fluid is covered by the second fluid.

Figure 4:
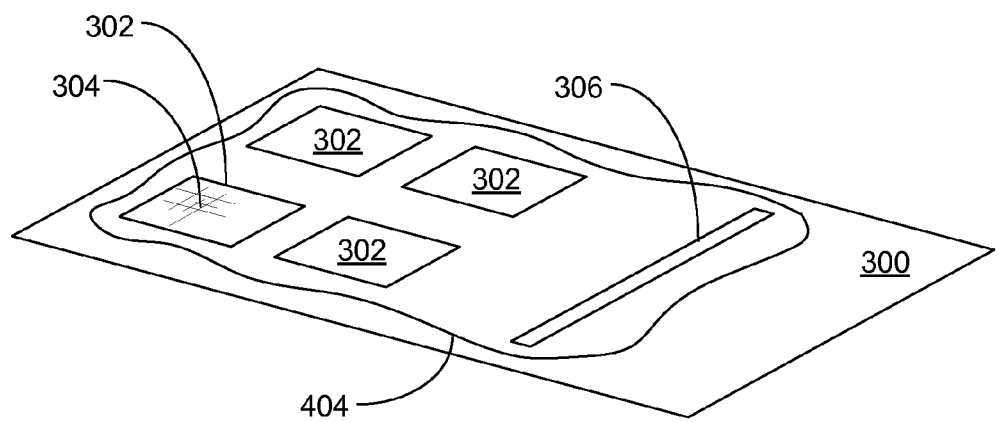

In addition to display element arrays 302, substrate 300 includes a wetting strip 306 formed on a region of the substrate beyond where display element arrays 302 are located. Wetting strip 306 may comprise a low surface energy material, which may be a hydrophobic material, such as a fluoropolymer (e.g., AF1600). The wettability between the first fluid and wetting strip 306 is different from a wettability between the second fluid and wetting strip 306. Some examples of benefits arising from the presence of wetting strip 306 are described below. A hydrophobicity of wetting strip 306 may be different from a hydrophobicity of a hydrophobic layer (e.g., hydrophobic layer 106) located in individual electrowetting elements, such as 106 shown in FIG. 1. In other implementations, however, the hydrophobicity of wetting strip 306 may be the same as the hydrophobicity of the hydrophobic layer located in the individual electrowetting elements, FIG. 4 illustrates a perspective view of substrate 300 after the double-slit fluid dispenser passed across substrate 300 while dispensing the first fluid and the second fluid. Individual display elements 304 of arrays 302 are at least partially filled with the first fluid. The first fluid is dispensed relatively uniformly by the double-slit fluid dispenser so that the first fluid at least partially and evenly fills the display elements. The second fluid subsequently covers the partially filled display element arrays (at least partially filled with the first fluid) and a substantial portion of substrate 300, forming a second fluid puddle 404.

As mentioned above, uniformity of the first fluid in the display elements subsequent to a fill process described, in part, by FIGS. 3 and 4 is an important aspect of fabrication. Wetting strip 306 on substrate 300 can improve fill uniformity of the first fluid in the display elements. During a filling process, wetting strip 306 improves fill uniformity by pushing back the second fluid relative to the first fluid as the double-slit fluid dispenser passes across substrate 300 and over wetting strip 306 in a direction such that dispensing of the first fluid leads the dispensing of the second fluid. In some implementations, the double-slit fluid dispenser may initially be placed directly over or just behind wetting strip 306. Such a push-back of the second fluid can result in a more uniform spread of the first fluid underneath the first slit (e.g., first fluid 202, illustrated in FIG. 2) of the double-slit fluid dispenser that dispenses the first fluid. Even after the first slit has passed wetting strip 306 and is no longer in close proximity to wetting strip 306, the first fluid continues to be more uniformly distributed across the first slit (e.g., as compared to the case sans a wetting strip), resulting in a more uniform fill of the display elements.

Figure 5:
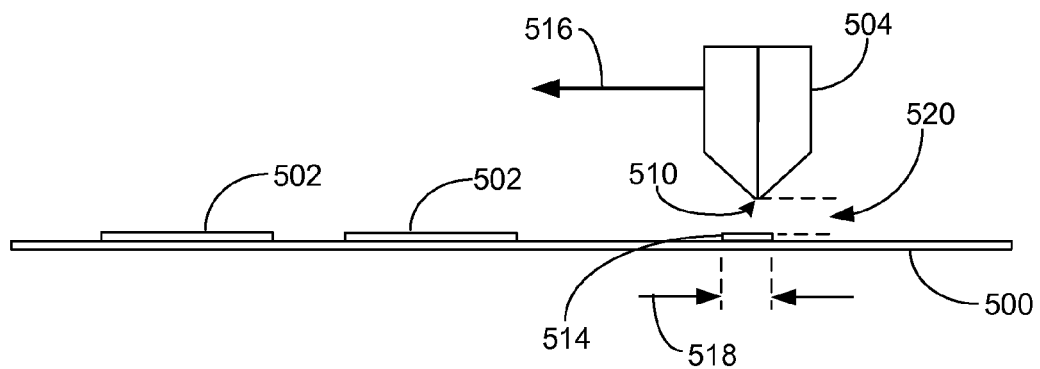
FIGS. 5 and 6 illustrate top views of a substrate with display element arrays formed thereon and a double-slit fluid dispenser, according to some embodiments.
Figure 6:
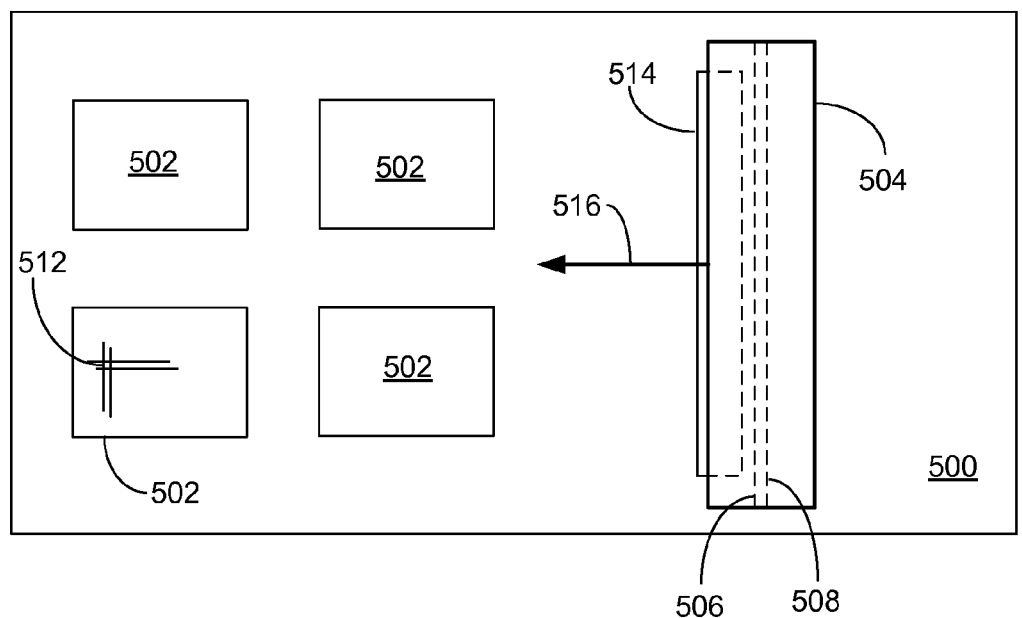

FIGS. 5 and 6 illustrate top views of a substrate 500 with display element arrays 502 formed thereon, according to some embodiments. Also illustrated is a double-slit fluid dispenser 504 that includes a first slit 506 and a second slit 508 in a region 510 for dispensing first and second fluids. This configuration is the same or similar to that illustrated in FIGS. 3 and 4. Display element arrays 502 include a relatively large number of individual display elements 512. Portions of substrate 500 underlying individual display element arrays 502 will later become a permanent part of display devices (e.g., as a substrate such as 104 illustrated in FIG. 1). Double-slit fluid dispenser 504, which is similar to or the same as 200 illustrated in FIG. 2, for example, is initially placed over substrate 500 in preparation to dispense first and second fluids onto substrate 500 and display element arrays 502. In some implementations, the first fluid and the second fluid may be the same as or similar to first fluid 110 and second fluid 114, respectively, shown in FIG. 1. Double-slit fluid dispenser 504 may initially be placed directly over or just behind (relative to positions of display element arrays 502 on substrate 500) a wetting strip 514. As described above, such a wetting strip may comprise a low surface energy (e.g., hydrophobic) material, such as a fluoropolymer, so that a wettability between the first fluid and wetting strip 514 is different from a wettability between the second fluid and wetting strip 514. When double-slit fluid dispenser 504 is set into motion toward display element arrays 502, as indicated by arrow 516, double-slit fluid dispenser 504 dispenses the first fluid from slit 512 and the second fluid from slit 514 onto substrate 500 and display element arrays 502.

In particular, double-slit fluid dispenser 504 dispenses the first and second fluids as the double-slit fluid dispenser moves over substrate 500 (and display element arrays 502). The first fluid is dispensed relatively uniformly by the double-slit fluid dispenser so that the first fluid at least partially and evenly fills individual display elements 512. The second fluid subsequently fills display element arrays 502 (having display elements 512 at least partially filled with the first fluid) and may cover a substantial portion of substrate 500.

As mentioned above, uniformity of the first fluid in the display elements subsequent to a fill process described, in part, by FIGS. 3 and 4 is an important aspect of fabrication. Wetting strip 514 on substrate 500 can improve fill uniformity by pushing back the second fluid relative to the first fluid as double-slit fluid dispenser 504 passes across substrate 500 and over wetting strip 514 in a direction such that dispensing of the first fluid leads the dispensing of the second fluid. Such a push-back of the second fluid results in a more uniform spread of the first fluid underneath first slit 506 dispensing the first fluid. Even after first slit 506 has passed wetting strip 514 and is no longer in close proximity to wetting strip 514, the first fluid continues to be more uniformly distributed across first slit 506 (e.g., as compared to the case sans a wetting strip), resulting in a more uniform fill of the display elements.

In some implementations, a width 518 of wetting strip 514 may be on the order of several millimeters, though claimed subject matter is not limited in this respect. Double-slit fluid dispenser 504 may move across substrate 500 and display element arrays 502 at a height 520 so that double-slit fluid dispenser 504 is about 150 microns above pixel walls (such as pixel walls 108, illustrated in FIG. 1) of display element arrays 502.

Figure 7:
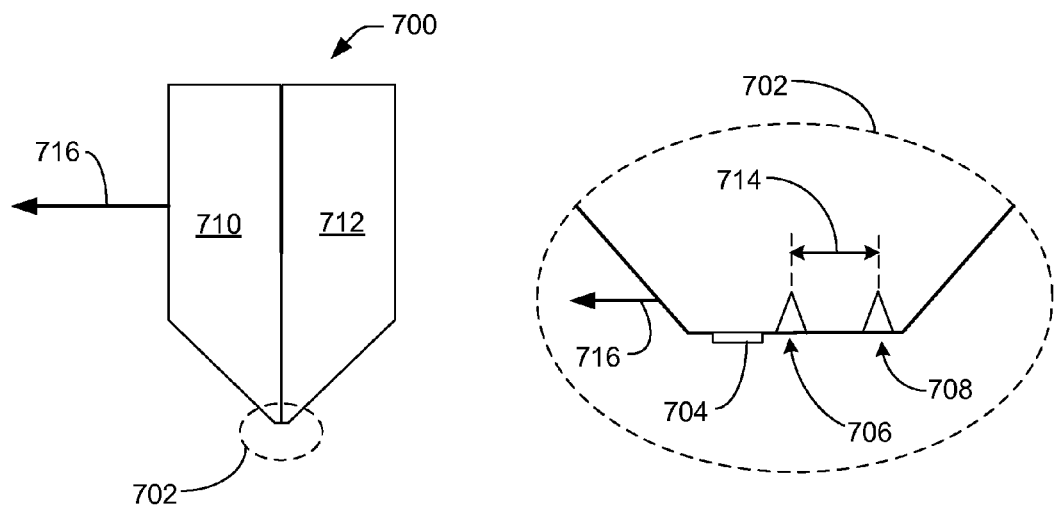
FIG. 7 illustrates a side view of a double-slit fluid dispenser that includes a wetting strip, according to some embodiments.

FIG. 7 illustrates a side view of a double-slit fluid dispenser 700 and a close-up region 702, according to some embodiments. In contrast to double-slit fluid dispenser 200 illustrated in FIG. 2, double-slit fluid dispenser 700 includes a wetting strip 704. Similar to or the same as double-slit fluid dispenser 200, fluid dispenser 700 is configured to dispense a first fluid (e.g., an opaque oil) and a second fluid (e.g., an electrolyte solution) onto a substrate that includes one or more display element arrays (not illustrated in FIG. 7). For example, a portion of such a substrate may be the same or similar to substrate 104 illustrated in FIG. 1. Fluid dispenser 700 may include a first slit 706 for dispensing the first fluid and a second slit 708 for dispensing the second fluid. In some implementations, the first fluid may be transiently contained in first reservoir 710 and the second fluid may be transiently contained in second reservoir 712. A distance 714 between first slit 706 and second slit 708 may be in a range of about 1 to 5 millimeters, for example. Lengths (e.g., as measured into and out of the page of FIG. 7) of first slit 706 and second slit 708 may range from several centimeters to about 40 centimeters, just to give some examples. In particular, the lengths of the slits are sufficient to at least approximately span the width of the substrate onto which fluid dispenser 700 dispenses first and second fluids.

During a fabrication process for placing the first and second fluids in display element arrays formed on a substrate, fluid dispenser 700 moves in a direction 716 relative to the underlying substrate. Fluid dispenser 700 dispenses the first fluid into individual display elements of the display element arrays. Fluid dispenser 700 dispenses the second fluid so as to cover the first fluid and the individual display elements.

Wetting strip 704 may comprise a low surface energy material, which may be, for example a hydrophobic material such as a fluoropolymer (e.g., AF1600). A wettability between the first fluid and the wetting strip is different from a wettability between the second fluid and the wetting strip. Uniformity of the dispensed first fluid in the display elements is influenced by the uniformity of the first fluid along the width of first slit 706 during the fluid dispensing and display-element filling process. Wetting strip 704 comprising a low surface energy (e.g., hydrophobic) coating in the tip region of double-slit fluid dispenser 700 along the width of first slit 706 can improve uniformity of the dispensed first fluid, as compared to a fluid dispenser sans a wetting strip. Forces arise from surface energy differences between the first fluid and the second fluid. Such forces lead to the first fluid wetting the low surface energy coating of wetting strip 704 while the second fluid is repelled. This situation helps ensure that the second fluid remains behind first slit 706 and a thin uniform layer of the first fluid forms underneath first slit 706 at or near the location of wetting strip 704.

In some embodiments, double-slit fluid dispenser 700 that includes wetting strip 704 is used in conjunction with a substrate that also includes a wetting strip. In other embodiments, double-slit fluid dispenser 700 that includes wetting strip 704 is used in conjunction with a substrate that does not include a wetting strip.

Figure 8:
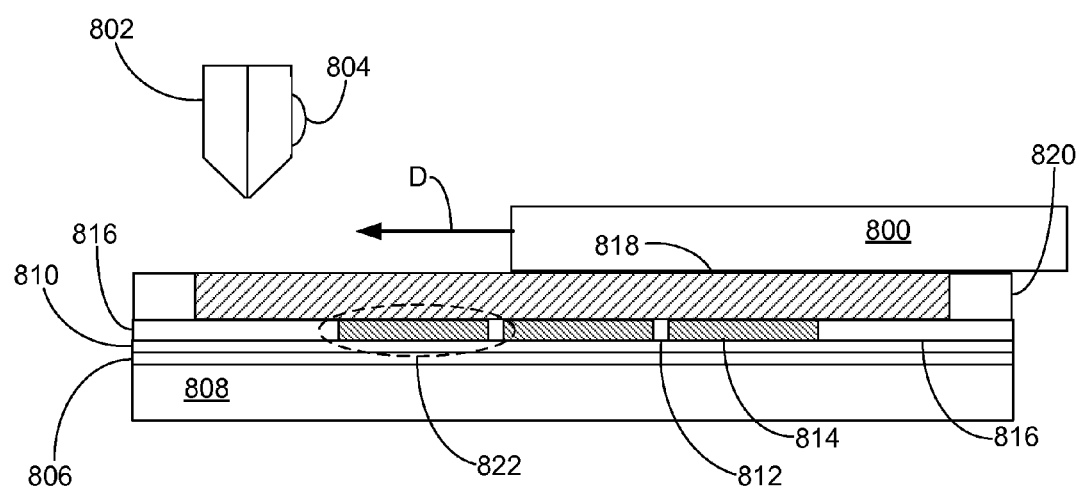
FIG. 8 illustrates a cross-section of a portion of an electrowetting display device and a top plate covering at least a portion of the electrowetting display device, according to some embodiments.

FIG. 8 illustrates a cross-section of a portion of an electrowetting display device and a top plate 800 covering at least a portion of the electrowetting display device, according to some embodiments. The electrowetting display device is similar to or the same as the electrowetting display device illustrated in FIG. 1, except that FIG. 8 depicts an intermediate portion of a process of fabricating the electrowetting display device. In particular, top plate 800 is being moved onto a lower portion of the electrowetting display device in a direction indicated by arrow "D", and is not completely in its final place on the electrowetting display device, as explained below. For example, a fluid dispenser 802 is represented schematically to illustrate an attachment portion 804 that may be used to impart motion (e.g., dragging, pulling, pushing, and so on) to top plate 800. Such a fabrication process of moving a top plate onto the lower portion of an electrowetting display device provides a number of benefits, such as an increased ability to control behavior of a fluid (e.g., electrolyte solution) dispensed onto the lower portion of an electrowetting display device, as explained below.

The electrowetting display device includes an electrode layer 806 formed on a substrate 808. In some implementations, a dielectric barrier layer (not illustrated) may at least partially separate electrode layer 806 from a hydrophobic layer 810 also formed on substrate 808. In some implementations, hydrophobic layer 810 can comprise a fluoropolymer, such as AF1600, though claimed subject matter is not limited in this respect. Pixel walls 812 form a patterned electrowetting element grid on hydrophobic layer 810. Pixel walls 812 may comprise a photoresist material, such as epoxy-based negative photoresist SU-8. A first fluid 814, which can have a thickness (e.g., depth) in a range of about 1 to 10 microns, for example, overlies hydrophobic layer 810. First fluid 814 is partitioned by pixel walls 812 of the patterned electrowetting element grid. An outer rim 816 can comprise the same material as pixel walls 812. A second fluid 818, such as an electrolyte solution, overlies first fluid 814 and pixel walls 812 of the patterned electrowetting element grid.

Top plate 800, subsequent to being moved completely onto the display device, covers second fluid 818. Edge seals 820 contain second fluid 818 over the electrowetting element array. The substrate and the top plate may be made of glass or polymer and may be rigid or flexible, for example. Individual display elements 822 retain first fluid 814 using pixel walls 812, while second fluid covers both first fluid 814 and pixel walls 812.

Figure 9:
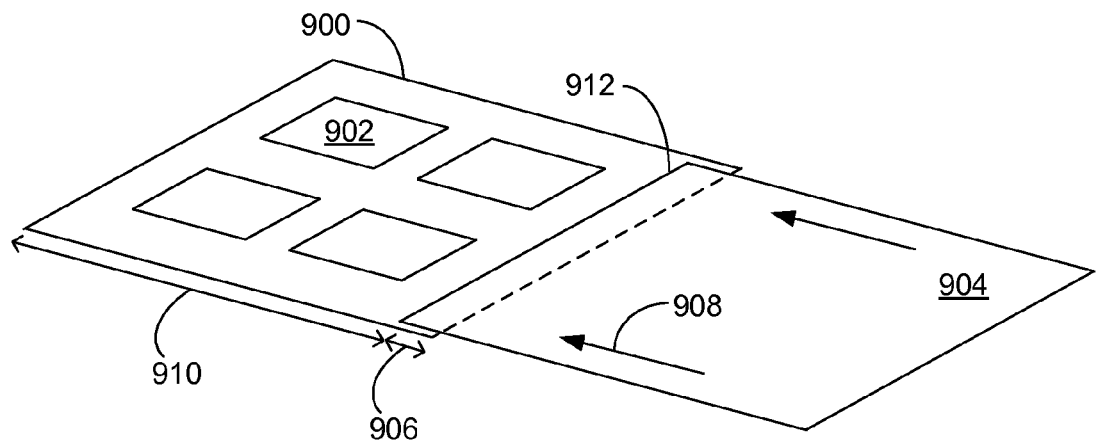
FIGS. 9 and 10 illustrate perspective views of a substrate with display element arrays formed thereon and a top plate covering at least a portion of the substrate, according to some embodiments.

FIG. 9 illustrates a perspective view of a substrate 900 with display element arrays 902 formed thereon and a top plate 904 covering at least a portion 906 of the substrate, according to some embodiments for fabricating an electronic display device. As depicted in FIG. 9 by arrows 908, top plate 904 is moved onto and over substrate 900 and display element arrays 902. In detail, though not illustrated in FIG. 9, a double-slit fluid dispenser is used to dispense a first fluid and a second fluid onto substrate 900, as explained above. As the double-slit fluid dispenser is moved across substrate 900 to dispense the first fluid and the second fluid onto the substrate, top plate 904 is moved over substrate 900. A portion 910 of substrate 900 not yet covered by top plate 904 is first covered with the first and second fluids by the double-slit fluid dispenser near (e.g., several millimeters) a leading edge 912 of top plate 904. As the double-slit fluid dispenser moves over substrate 900 in a direction 908, top plate 904 and leading edge 912 also move over the substrate. Thus, an increasing area of substrate 900 is covered with the first and second fluids and top plate 904 follows shortly thereafter. Because the first and second fluids are deposited in front of top plate 904, the top plate is at least partially supported by the first and second fluids, which are located between substrate 900 and the top plate.

In some implementations, the double-slit fluid dispenser includes a connection portion to where top plate 904 can be connected to be dragged with the motion of the double-slit fluid dispenser.

Figure 10:
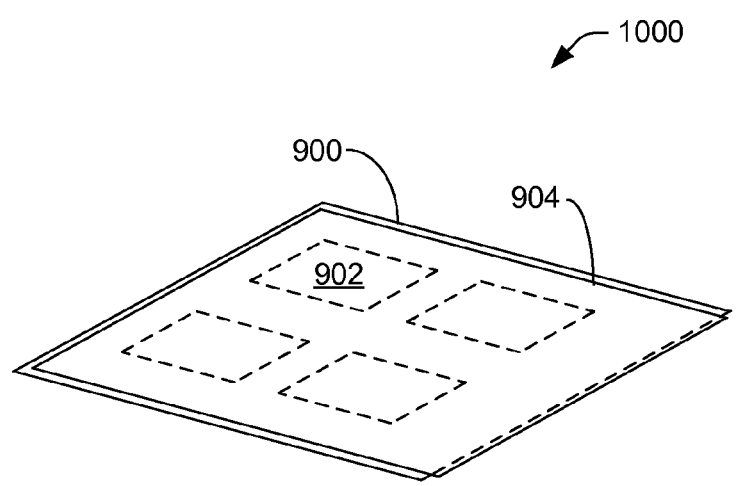

FIG. 10 illustrates a perspective view of substrate 900 and display element arrays 902 being covered by top plate 904 (with first and second fluids located therebetween). Subsequent to the situation depicted in FIG. 10, the structure 1000, including substrate 900, top plate 904 and a number of elements therebetween, may be placed in a roller to squeeze out excess fluids and to laminate top plate 904 onto display element arrays 902. This lamination process also squeezes top plate 904 toward substrate 900 so that top plate 904 becomes supported by structure, such as edge seals and spacers (e.g., edge seals 118 and spacers 120 illustrated in FIG. 1) previously formed on substrate 900. Consequently, while the first fluid is substantially retained within individual display elements, the second fluid is retained in the display element array by the edge seals in cooperation with the substrate and the top plate. Subsequent to the laminating process, individual display element arrays 902, and portions of top plate 904 laminated to them, can be partitioned by cutting structure 1000 at or near peripheries of the display element arrays.

A number of benefits arise from fabricating an electronic display device by moving a top plate over a lower portion of an electrowetting display device. For example, sans a top plate during a portion of fabrication, if substrate 900 is held at a small incline, the first and second fluids can flow off the substrate, and the substrate may be ruined. However, by moving or dragging the top plate immediately behind the double-slit fluid dispenser, top plate 904 maintains the first and second fluids and thus reduces the risk of the fluids flowing off the substrate even if the substrate is inclined. Top plate 904 and substrate 900 cooperatively form a capillary in which the fluids are contained. An another example of a benefit of moving or dragging a top plate behind a double-slit fluid dispenser, a relatively thin layer of the second fluid (e.g., electrolyte solution) can be dispensed compared to the case where a top plate is not immediately moved or dragged over dispensed fluids.

Figure 11:
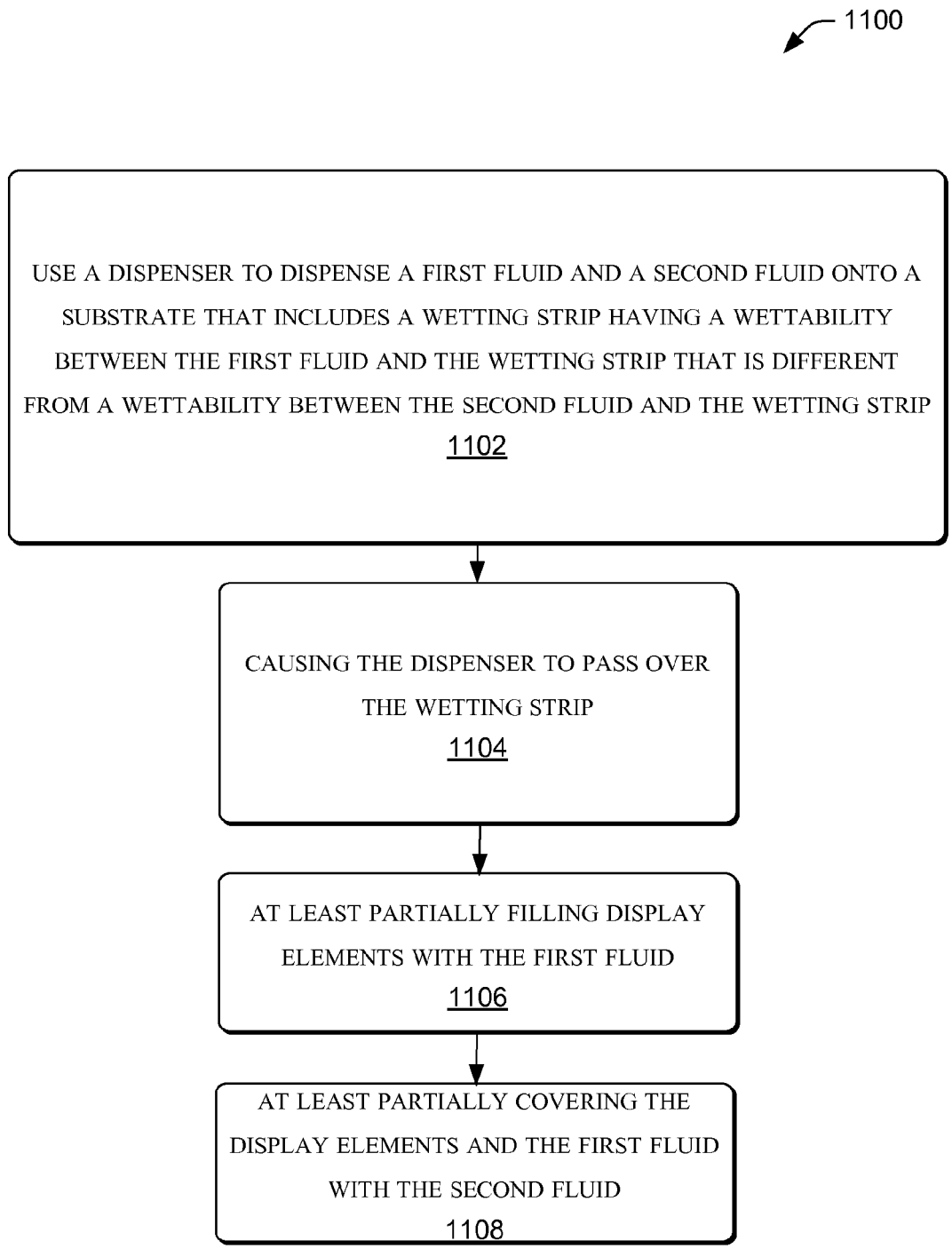
FIG. 11 is a flow diagram of a process for fabricating an electrowetting display device, according to various example embodiments.

FIG. 11 is a flow diagram of a process for fabricating an electrowetting display device, according to various embodiments. For example, the electrowetting display device may be the same as or similar to the electrowetting display device illustrated in FIG. 1. At block 1102, a double-slit fluid dispenser is used to dispense a first fluid and a second fluid onto a transparent substrate. For example, such a double-slit fluid dispenser may be similar to 200, illustrated in FIG. 2. As another example, such a double-slit fluid dispenser may be similar to 700, which includes a wetting strip, as illustrated in FIG. 7. The double-slit fluid dispenser is used to dispense a first fluid, such as an opaque oil, and a second fluid, such as an electrolyte solution, onto a substrate, which may be transparent. One or more arrays of display elements and a wetting strip are formed on the substrate. A wettability between the first fluid and the wetting strip is different from a wettability between the second fluid and the wetting strip.

At block 1104, the double-slit fluid dispenser is passed over the wetting strip formed on the glass substrate, as depicted in FIGS. 5 and 6, for example. At block 1106, display elements of the arrays are at least partially filled with the first fluid. Pixel walls of the individual display elements retain the first fluid within the individual display elements. At block 1108, the display elements and the first fluid are at least partially covered with the second fluid.

Figure 12:
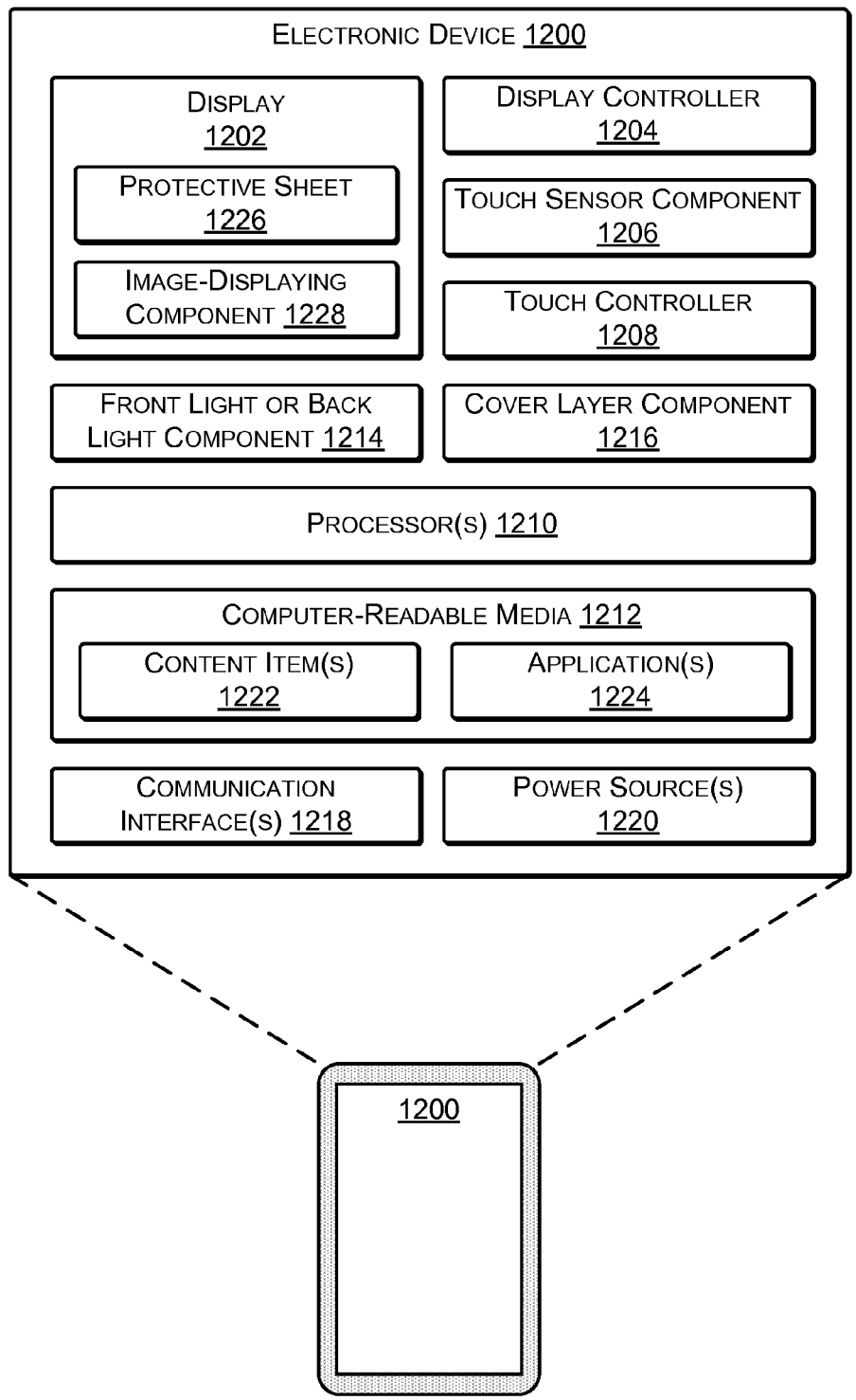
FIG. 12 illustrates an example electronic device that may incorporate a display device, according to some embodiments.

FIG. 12 illustrates an example electronic device 1200 that may incorporate any of the display devices discussed above. The device 1200 may comprise any type of electronic device having a display. For instance, the device 1200 may be a mobile electronic device (e.g., an electronic book reader, a tablet computing device, a laptop computer, a smart phone or other multifunction communication device, a portable digital assistant, a wearable computing device, an automotive display, etc.). Alternatively, the device 1200 may be a non-mobile electronic device (e.g., a computer display, a television, etc.). In addition, while FIG. 12 illustrates several example components of the electronic device 1200, it is to be appreciated that the device 1200 may also include other conventional components, such as an operating system, system busses, input/output components, and the like. Further, in other examples, such as in the case of a television or computer monitor, the electronic device 1200 may only include a subset of the components illustrated.

Regardless of the specific implementation of the electronic device 1200, the device 1200 includes a display 1202 and a corresponding display controller 1204. The display 1202 may represent a reflective or transmissive display in some instances, such as an electronic paper display, a reflective or transmissive LCD display, or the like. Electronic paper displays represent an array of display technologies that largely mimic the look of ordinary ink on paper. In contrast to conventional backlit displays, electronic paper displays typically reflect light, much as ordinary paper does. In addition, electronic paper displays are often bi-stable, meaning that these displays are capable of holding text or other rendered images even when very little or no power is supplied to the display. Some examples of the display 1202 that may be used with the implementations described herein include bi-stable LCD displays, micro electromechanical system (MEMS) displays, such as interferometric modulator displays, cholesteric displays, electrophoretic displays, electrofluidic pixel displays, electrowetting displays, photonic ink displays, gyricon displays, and the like. In other implementations, or for other types of devices 1200, the display 1202 may be an active display such as a fluid crystal display, a plasma display, a light emitting diode display, an organic light emitting diode display, and so forth. Accordingly, implementations herein are not limited to any particular display technology.

In an implementation, the display comprises an electrowetting display that employs an applied voltage to change the surface tension of a fluid in relation to a surface. For example, such an electrowetting display may include the array of pixels 100 illustrated in FIG. 1, though claimed subject matter is not limited in this respect. By applying a voltage to a hydrophobic surface, the wetting properties of the surface can be modified so that the surface becomes increasingly hydrophilic. As one example of an electrowetting display, the modification of the surface tension acts as an optical switch by contracting a colored oil film when a voltage is applied to individual pixels of the display. When the voltage is absent, the colored oil forms a continuous film within a pixel, and the color may thus be visible to a user of the display. On the other hand, when the voltage is applied to the pixel, the colored oil is displaced and the pixel becomes transparent. When multiple pixels of the display are independently activated, the display can present a color or grayscale image. The pixels may form the basis for a transmissive, reflective, or transmissive/reflective (transreflective) display. Further, the pixels may be responsive to high switching speeds (e.g., on the order of several milliseconds), while employing small pixel dimensions. Accordingly, the electrowetting displays herein may be suitable for applications such as displaying video content.

Of course, while several different examples have been given, it is to be appreciated that the reflective displays described herein may comprise any other type of electronic-paper technology or reflective-display technology, examples of which are provided above. In addition, while some of the examples described above are discussed as rendering black, white, and varying shades of gray, it is to be appreciated that the described techniques apply equally to reflective displays capable of rendering color pixels. As such, the terms "white," "gray," and "black" may refer to varying degrees of color in implementations utilizing color displays. For instance, where a pixel includes a red color filter, a "gray" value of the pixel may correspond to a shade of pink while a "black" value of the pixel may correspond to a darkest red of the color filter. Furthermore, while some examples herein are described in the environment of a reflective display, in other examples, the display 1202 may represent a backlit display, examples of which are mentioned above.

In addition to including the display 1202, FIG. 12 illustrates that some examples of the device 1200 may include a touch sensor component 1206 and a touch controller 1208. In some instances, at least one touch sensor component 1206 resides with, or is stacked on, the display 1202 to form a touch-sensitive display (e.g., an electronic paper touch-sensitive display). Thus, the display 1202 may be capable of both accepting user touch input and rendering content in response to or corresponding to the touch input. As several examples, the touch sensor component 1206 may comprise a capacitive touch sensor, a force sensitive resistance (FSR), an interpolating force sensitive resistance (IFSR) sensor, or any other type of touch sensor. In some instances, the touch sensor component 1206 is capable of detecting touches as well as determining an amount of pressure or force of these touches.

FIG. 12 further illustrates that the electronic device 1200 may include one or more processors 1210 and one or more computer-readable media 1212, as well as a front light component 1214 (which may alternatively be a backlight component in the case of a backlit display) for lighting the display 1202, a cover layer component 1216, such as a cover glass or cover sheet, one or more communication interfaces 1218 and one or more power sources 1220. The communication interfaces 1218 may support both wired and wireless connection to various networks, such as cellular networks, radio, WiFi networks, short range networks (e.g., Bluetooth®), infrared (IR), and so forth.

Depending on the configuration of the electronic device 1200, the computer-readable media 1212 (and other computer-readable media described throughout) is an example of computer storage media and may include volatile and non-volatile memory. Thus, the computer-readable media 1212 may include, but is not limited to, RAM, ROM, EEPROM, flash memory, or other memory technology, or any other medium that can be used to store computer-readable instructions, programs, applications, media items, and/or data which can be accessed by the electronic device 1200.

The computer-readable media 1212 may be used to store any number of functional components that are executable on the processor 1210, as well as content items 1222 and applications 1224. Thus, the computer-readable media 1212 may include an operating system and a storage database to store one or more content items 1222, such as eBooks, audio books, songs, videos, still images, and the like. The computer-readable media 1212 of the electronic device 1200 may also store one or more content presentation applications to render content items on the device 1200. These content presentation applications may be implemented as various applications 1224 depending upon the content items 1222. For instance, the content presentation application may be an electronic book reader application for rending textual electronic books, an audio player for playing audio books or songs, a video player for playing video, and so forth.

In some instances, the electronic device 1200 may couple to a cover (not illustrated in FIG. 12) to protect the display (and other components in the display stack or display assembly) of the device 1200. In one example, the cover may include a back flap that covers a back portion of the device 1200 and a front flap that covers the display 1202 and the other components in the stack. The device 1200 and/or the cover may include a sensor (e.g., a Hall effect sensor) to detect when the cover is open (i.e., when the front flap is not atop the display and other components). The sensor may send a signal to the front light component 1214 when the cover is open and, in response, the front light component 1214 may illuminate the display 1202. When the cover is closed, meanwhile, the front light component 1214 may receive a signal indicating that the cover has closed and, in response, the front light component 1214 may turn off.

Furthermore, the amount of light emitted by the front light component 1214 may vary. For instance, upon a user opening the cover, the light from the front light may gradually increase to its full illumination. In some instances, the device 1200 includes an ambient light sensor (not illustrated in FIG. 12) and the amount of illumination of the front light component 1214 may be based at least in part on the amount of ambient light detected by the ambient light sensor. For example, the front light component 1214 may be dimmer if the ambient light sensor detects relatively little ambient light, such as in a dark room; may be brighter if the ambient light sensor detects ambient light within a particular range; and may be dimmer or turned off if the ambient light sensor detects a relatively large amount of ambient light, such as direct sunlight.

In addition, the settings of the display 1202 may vary depending on whether the front light component 1214 is on or off, or based on the amount of light provided by the front light component 1214. For instance, the electronic device 1200 may implement a larger default font or a greater contrast when the light is off compared to when the light is on. In some instances, the electronic device 1200 maintains, when the light is on, a contrast ratio for the display that is within a certain defined percentage of the contrast ratio when the light is off.

As described above, the touch sensor component 1206 may comprise a capacitive touch sensor that resides atop the display 1202. In some examples, the touch sensor component 1206 may be formed on or integrated with the cover layer component 1216. In other examples, the touch sensor component 1206 may be a separate component in the stack of the display assembly. The front light component 1214 may reside atop or below the touch sensor component 1206. In some instances, either the touch sensor component 1206 or the front light component 1214 is coupled to a top surface of a protective sheet 1226 of the display 1202. As one example, the front light component 1214 may include a lightguide sheet and a light source (not illustrated in FIG. 12). The lightguide sheet may comprise a substrate (e.g., a transparent thermoplastic such as PMMA or other acrylic), a layer of lacquer and multiple grating elements formed in the layer of lacquer that function to propagate light from the light source towards the display 1202, thus illuminating the display 1202.

The cover layer component 1216 may include a transparent substrate or sheet having an outer layer that functions to reduce at least one of glare or reflection of ambient light incident on the electronic device 1200. In some instances, the cover layer component 1216 may comprise a hard-coated polyester and/or polycarbonate film, including a base polyester or a polycarbonate, that results in a chemically bonded UV-cured hard surface coating that is scratch resistant. In some instances, the film may be manufactured with additives such that the resulting film includes a hardness rating that is greater than a predefined threshold (e.g., at least a hardness rating that is resistant to a 3h pencil). Without such scratch resistance, a device may be more easily scratched and a user may perceive the scratches from the light that is dispersed over the top of the reflective display. In some examples, the protective sheet 1226 may include a similar UV-cured hard coating on the outer surface. The cover layer component 1216 may couple to another component or to the protective sheet 1226 of the display 1202. The cover layer component 1216 may, in some instances, also include a UV filter, a UV-absorbing dye, or the like, for protecting components lower in the stack from UV light incident on the electronic device 1200. In still other examples, the cover layer component 1216 may include a sheet of high-strength glass having an antiglare and/or antireflective coating.

The display 1202 includes the protective sheet 1226 overlying an image-displaying component 1228. For example, the display 1202 may be preassembled to have the protective sheet 1226 as an outer surface on the upper or image-viewing side of the display 1202. Accordingly, the protective sheet 1226 may be integral with and may overlie the image-displaying component 1228. The protective sheet 1226 may be optically transparent to enable a user to view, through the protective sheet 1226, an image presented on the image-displaying component 1228 of the display 1202.

In some examples, the protective sheet 1226 may be a transparent polymer film in the range of 25 to 200 micrometers in thickness. As several examples, the protective sheet may be a transparent polyester, such as polyethylene terephthalate (PET) or polyethylene naphthalate (PEN), or other suitable transparent polymer film or sheet, such as a polycarbonate or an acrylic. In some examples, the outer surface of the protective sheet 1226 may include a coating, such as the hard coating described above. For instance, the hard coating may be applied to the outer surface of the protective sheet 1226 before or after assembly of the protective sheet 1226 with the image-displaying component 1228 of the display 1202. In some examples, the hard coating may include a photoinitiator or other reactive species in its composition, such as for curing the hard coating on the protective sheet 1226. Furthermore, in some examples, the protective sheet 1226 may be dyed with a UV-light-absorbing dye, or may be treated with other UV-absorbing treatment. For example, the protective sheet may be treated to have a specified UV cutoff such that UV light below a cutoff or threshold wavelength is at least partially absorbed by the protective sheet 1226, thereby protecting the image-displaying component 1228 from UV light.

According to some implementations herein, one or more of the components discussed above may be coupled to the display 1202 using fluid optically-clear adhesive (LOCA). For example, suppose that the light guide portion of the front light component 1214 is to be coupled to the display 1202. The light guide may be coupled to the display 1202 by placing the LOCA on the outer or upper surface of the protective sheet 1226. When the LOCA reaches the corner(s) and/or at least a portion of the perimeter of protective sheet, UV-curing may be performed on the LOCA at the corners and/or the portion of the perimeter. Thereafter, the remaining LOCA may be UV-cured and the front light component 1214 may be coupled to the LOCA. By first curing the corner(s) and/or perimeter, the techniques effectively create a barrier for the remaining LOCA and also prevent the formation of air gaps in the LOCA layer, thereby increasing the efficacy of the front light component 1214. In other implementations, the LOCA may be placed near a center of the protective sheet 1226, and pressed outwards towards a perimeter of the top surface of the protective sheet 1226 by placing the front light component 1214 on top of the LOCA. The LOCA may then be cured by directing UV light through the front light component 1214. As discussed above, and as discussed additionally below, various techniques, such as surface treatment of the protective sheet, may be used to prevent discoloration of the LOCA and/or the protective sheet 1226.

While FIG. 12 illustrates a few example components, the electronic device 1200 may have additional features or functionality. For example, the device 1200 may also include additional data storage devices (removable and/or non-removable) such as, for example, magnetic disks, optical disks, or tape. The additional data storage media, which may reside in a control board, such as control board 124 illustrated in FIG. 2, may include volatile and nonvolatile, removable and non-removable media implemented in any method or technology for storage of information, such as computer readable instructions, data structures, program modules, or other data. In addition, some or all of the functionality described as residing within the device 1200 may reside remotely from the device 1200 in some implementations. In these implementations, the device 1200 may utilize the communication interfaces 1218 to communicate with and utilize this functionality.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications can be made, and equivalents can be substituted, without departing from claimed subject matter. Additionally, many modifications can be made to adapt a particular situation to the teachings of claimed subject matter without departing from the central concept described herein. Therefore, it is intended that claimed subject matter not be limited to the particular embodiments disclosed, but that such claimed subject matter can also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter can be practiced without these specific details. In other instances, methods, apparatuses, or systems that would be known by one of ordinary skill have not been described in detail so as not to obscure claimed subject matter.

Reference throughout this specification to "one embodiment" or "an embodiment" can mean that a particular feature, structure, or characteristic described in connection with a particular embodiment can be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described can be combined in various ways in one or more embodiments. In general, of course, these and other issues can vary with the particular context of usage. Therefore, the particular context of the description or the usage of these terms can provide helpful guidance regarding inferences to be drawn for that context.

What is claimed is:

1. A substrate for an electronic display device, the substrate comprising:
   a plurality of arrays of display elements formed in a first area on the substrate, wherein the display elements are configured to at least partially retain a first fluid and a second fluid; and
   a wetting strip formed in a second area different from the first area on the substrate, wherein a wettability between the first fluid and the wetting strip is different from a wettability between the second fluid and the wetting strip.

2. The substrate of claim 1, wherein the display elements include a hydrophobic layer having a hydrophobicity different from a hydrophobicity of the wetting strip.

3. The substrate of claim 1, wherein the substrate further comprises a hydrophobic layer located in the display elements, and wherein the wetting strip and the hydrophobic layer comprise a fluoropolymer.

4. The substrate of claim 1, wherein the plurality of arrays of display elements formed on the substrate individually include:
   pixel walls extending to a first height from the substrate and surrounding each of the display elements; and
   an array wall extending to a second height greater than the first height and surrounding the array of display elements.

5. The substrate of claim 1, wherein the plurality of arrays of display elements formed on the substrate individually comprise a portion of an electrowetting display.

6. The substrate of claim 1, wherein the plurality of arrays of the display elements are formed on the substrate in rows and columns in the first area of the substrate.

7. The substrate of claim 1, wherein the substrate further comprises thin film transistor (TFT) circuitry.

8. The substrate of claim 1, wherein the first fluid comprises an oil and the second fluid comprises an electrolyte solution.

9. A substrate for an electrowetting display device, the substrate comprising:
   pixel arrays formed on a first region of the substrate, wherein individual pixels of the pixel arrays include pixel walls that at least partially retain a first fluid;
   a second fluid at least partially covering the pixel arrays; and
   a wetting strip formed on a second region of the substrate that is different from the first region, wherein a first wettability between the first fluid and the wetting strip is different from a second wettability between the second fluid and the wetting strip.

10. The substrate of claim 9, wherein the individual pixels of the pixel arrays formed on the first region of the substrate include a hydrophobic layer having a hydrophobicity different from a hydrophobicity of the wetting strip.

11. The substrate of claim 9, wherein the wetting strip comprises a fluoropolymer.

12. The substrate of claim 9, wherein the substrate further comprises thin film transistor (TFT) circuitry.

13. The substrate of claim 9, wherein the first fluid comprises an oil and the second fluid comprises an electrolyte solution.

14. The substrate of claim 9, wherein the substrate comprises glass.

15. The substrate of claim 9, wherein the first region of the substrate has a first width and the wetting strip has a second width that is greater than the first width.

16. The substrate of claim 9, wherein the substrate is a single substrate and the pixel arrays each correspond to an individual electrowetting display device.

17. The substrate of claim 16, wherein the substrate includes rows among the pixel arrays that are configured to be cut to partition and separate the pixel arrays from one another.

18. The substrate of claim 9, wherein the second fluid covers the rows among the pixel arrays.

19. The substrate of claim 9, wherein the pixel walls extend to a first height from the substrate and the wetting strip extends to a second height from the substrate, and wherein the second height is less than the first height.

* * * * *